United States Patent
Ohashi

(10) Patent No.: US 6,606,019 B1
(45) Date of Patent: Aug. 12, 2003

(54) RARE EARTH-BASED SINTERED MAGNET AND PERMANENT MAGNET SYNCHRONOUS MOTOR THEREWITH

(75) Inventor: Ken Ohashi, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/595,032

(22) Filed: Jun. 16, 2000

(30) Foreign Application Priority Data

Jun. 30, 1999 (JP) .......................................... 11-185681

(51) Int. Cl.$^7$ ................................................ H01F 7/02
(52) U.S. Cl. ....................................... 335/302; 335/306
(58) Field of Search ................... 310/156; 335/302–306

(56) References Cited

U.S. PATENT DOCUMENTS

| 5,506,557 A | * | 4/1996 | Sakaguchi et al. .......... 335/296 |
| 5,744,887 A | | 4/1998 | Itoh |
| 6,081,058 A | * | 6/2000 | Suzuki et al. ................ 310/156 |

FOREIGN PATENT DOCUMENTS

WO          97/18613          5/1997

OTHER PUBLICATIONS

Patent Abstracts of Japan, 011(No. 046)(E–479) Feb. 12, 1987—Abstract of JP61 208815 A.

Patent Abstracts of Japan, 1997(No. 08) Aug. 29, 1997—Abstract of JP 09 093895 A.

* cited by examiner

Primary Examiner—Lincoln Donovan
(74) Attorney, Agent, or Firm—Wenderoth, Lind & Ponack, L.L.P.

(57) ABSTRACT

Disclosed is a rare earth-based sintered permanent magnet block used in the rotor of a permanent magnet synchronous motor. The magnet block of the form having an upper surface and a lower surface in parallel is provided in each of the upper and lower surfaces with at least one narrow slit having a specified incision depth, width and length so as to decrease the adverse influences of the eddy currents generated in the magnet block while the running direction of the slits in the upper surface and the running direction of the slits in the lower surface make an angle of at least 10° or, preferably, 90° so that the decrease in the bending strength of the magnet block due to the slits can be minimized without decreasing the desired eddy current-decreasing effect.

6 Claims, 1 Drawing Sheet

RARE EARTH-BASED SINTERED MAGNET AND PERMANENT MAGNET SYNCHRONOUS MOTOR THEREWITH

BACKGROUND OF THE INVENTION

The present invention relates to a rare earth-based sintered permanent magnet and a permanent magnet synchronous motor therewith suitable for high-speed revolution as a motor of electric cars and a factory-automation motor.

As is well known many of compact motors built in electric and electronic instruments in the fields of acoustic and imaging technology are constructed by using rare earth-based permanent magnets. The reason therefor is that, since rare earth-based permanent magnets have very excellent magnetic properties such as coercive force and residual magnetic flux density as compared with other types of permanent magnets, a greatly increased freedom can be obtained in the design of electric motors by the use thereof enabling to construct a high-performance compact motor of small thickness which can be built in a compact-size instrument.

Since the rated power of these compact motors is mostly 100 watts or smaller, it is accepted heretofore that the eddy current and heat generation thereby in the rare earth-based permanent magnets have relatively small influences as the factors to cause a loss in the efficiency of motors as compared with other factors leading to a loss of the motor efficiency.

In contrast to the above mentioned situations heretofore in the permanent magnet motors, it is a trend in recent years that rare earth-based permanent magnets are used in much larger motors such as AC servomotors having a rated power of several hundreds watts to several tens kilowatts and DC brushless motors for driving electric cars having a rated power of up to several tens of kilowatts. Needless to say, rotors in many of these large motors require a rare earth-based permanent magnet much larger in size and capable of withstanding a high velocity revolution of the motor reaching 5000 rpm or even higher. As a result, the eddy current and heat generation thereby occurring in the rare earth-based permanent magnets, which present no particular problems in compact motors, can no longer be disregarded as a loss factor of the motor efficiency. Occurrence of eddy currents is also a serious problem in respect of motor control as in a rotor magnet which can be subject to application of a magnetic field in the reversed direction or rapid changes in the armature magnetic field. Accordingly, it is eagerly desired to urgently solve these problems, which can be disregarded in compact motors, in order for large-capacity motors with a rare earth-based magnet to go into orbit of practical application.

Rare earth-based permanent magnets in general have a volume resistivity in the order of $10^{-4}$ ohm·cm which is substantially higher than that of many iron-based materials of which the volume resistivity is in the order of $10^{-6}$ ohm·cm. A high resistivity of a magnet may be an advantageous factor for reducing the eddy currents. Different from iron-based materials from which a high-resistance structure can be constructed by utilizing thin plates suitable for punching works and lamination with intervention of insulating layers, however, a high-resistance structure cannot be formed of a rare earth-based permanent magnet material which must be used in a bulky form due to the relatively high brittleness of the material.

In the conventional synchronous motors built by utilizing a ferrite magnet, the eddy current generated in the magnet has absolutely no problem on the efficiency of the motor since ferrite magnets are inherently insulating as a material. Nevertheless, a sufficiently high efficiency suitable for practical use cannot be obtained in a large permanent magnet motor utilizing a ferrite magnet due to the low magnetic properties of ferrite magnets in general. The rare earth-based permanent magnets, on the other hand, belong to the class of metallic materials even though the resistivity thereof is relatively high as compared with other metallic materials for permanent magnets.

Under the above described situations including the application fields and conditions of use, accordingly, the most serious problem against a large motor using a rare earth-based permanent magnet is the eddy current generated in the magnet not only in respect of the decrease in the motor efficiency but also in respect of possible demagnetization of the magnet due to the temperature elevation by the heat generation caused by the eddy currents. Incidentally, no particular difference is noted relative to the eddy current loss or iron loss occurring in the rotor core of a large permanent magnet motor since the rotor core has a laminated structure of thin plates of an iron-based material or is a bulk core of an iron-based material even in a motor utilizing a rare earth-based permanent magnet.

The eddy current generated in a rare earth-based magnet can of course be decreased by utilizing a base material of the rare earth magnet alloy having a higher volume resistivity as in the ferrite-based permanent magnets. Alternatively, the eddy currents can be decreased in a so-called segment magnet which is an assemblage of a plurality of magnet segments adhesively bonded together with intervention of an insulating layer between adjacent segments. The former way involves a practically very difficult problem since the resistivity of the magnet material must be substantially increased without decreasing the inherent magnetic properties of the magnet.

Although, on the other hand, the latter way of segment magnets seems to be practical, the manufacturing cost of segment magnets is necessarily high because of the increase in the number of the process steps and a relatively low weight yield of the magnet material. Further, segment magnets are under a risk of relatively low corrosion resistance because a great difficulty is encountered in the surface treatment of the magnet segments for the formation of a highly corrosion-resistant insulating coating layer on the glueing surfaces of the segments. The idea for the use of magnet segments as such in the form of discrete small magnet pieces without glueing together is not successful because of the difficulty in obtaining high dimensional accuracy by mounting the magnet pieces on the proper positions of the rotor by resisting against the repulsive force between the magnet pieces.

Although no fundamental solution can be obtained for the problem of eddy currents in a rare earth-based permanent magnets per se, it would be a due direction of improvement to increase the heat resistance of the rare earth-based magnets with little demagnetization at an elevated temperature so that the magnet can be employed at an elevated temperature under little influences of the heat generated by the eddy currents. It is known, for example, that a Nd/Fe/B-based sintered magnet can be imparted with an increased coercive force by the addition of a certain additive element such as dysprosium to the base magnet alloy composition consequently leading to an improvement in the heat resistance of the magnet. Namely, a permanent magnet having a greatly increased coercive force at room temperature, when brought under an elevated temperature, can retain a coercive force sufficiently high to withstand demagnetization. Incidentally, Nd/Fe/B-based permanent magnets are required to have heat resistant against a temperature of 150° C. in an electrical-equipment motor and 200° C. in a driving motor of electric cars.

The above mentioned improvement in the coercive force of the Nd/Fe/B-based magnet, however, is not without problems because addition of an additive element to the alloy composition usually results in a decrease in the residual magnetization so that the magnetic flux density which can be taken out of the magnet is necessarily decreased. In addition, an increase in the material cost of the magnet is unavoidable by the use of an additional metallic element for the improvement of the heat resistance.

In view of the above described problems and disadvantages in the prior art, the inventor previously proposed a synchronous motor with a rare earth-based permanent magnet built therein, which is provided on one of the surfaces with a plurality of slits which have an effect of decreasing the effective cross sectional area available to eddy currents consequently contributing to a decrease of the eddy currents. Though effective for decreasing the eddy currents, the magnet block with slits necessarily leaves a bulk portion out of reach of the slits where no decreasing effect can be exhibited against generation of the eddy currents. In other words, the decreasing effect on the eddy currents is correlated with the depth of the slits formed in the magnet block. The incision depth of the slits formed in a magnet body cannot be too large because the mechanical strengths such as bending strength of the magnet block are greatly decreased by increasing the incision depth of the slits. Thus, the effect of slits formed in a magnet block for decreasing the eddy currents is directly limited by the tolerable depth of the slits.

As is described above, a permanent magnet synchronous motor of a kilowatt order or larger power utilizing a rare earth-based permanent magnet involves a serious problem of demagnetization of the magnet and a decrease in the efficiency of the motor under highspeed revolution due to the eddy currents generated in the magnet and the temperature elevation of the magnet as a consequence of the eddy currents.

SUMMARY OF THE INVENTION

The present invention accordingly has an object to provide a rare earth-based permanent magnet block which is little subject to the generation of eddy currents and also to provide a permanent magnet synchronous motor of which the rotor is constructed by utilizing the above mentioned rare earth-based permanent magnet so that the efficiency of the motor is little affected by the eddy currents generated in the permanent magnet of the rotor.

Thus, the present invention provides a rare earth-based sintered permanent magnet block in the form having an upper surface and a lower surface substantially in parallel to the upper surface, each surface being provided with at least one slit, of which the running direction of the slit in the upper surface and the running direction of the slit in the lower surface make an angle of at least 10° within the plane of the upper and lower surfaces and the total of the largest incision depth of the slits in the upper surface and the largest incision depth of the slits in the lower surface is not smaller than but not larger than 5/3 times of the distance between the upper and lower surfaces assuming that two or more slits are formed in each of the upper and lower surfaces.

The permanent magnet synchronous motor of the present invention comprises a rare earth-based sintered permanent magnet block as defined above arranged in such a disposition that the surface provided with the slits faces the armature of the motor.

DETAILED DESCRIPTION OF THE PREFERRED EMBODIMENTS

Figure 1A:
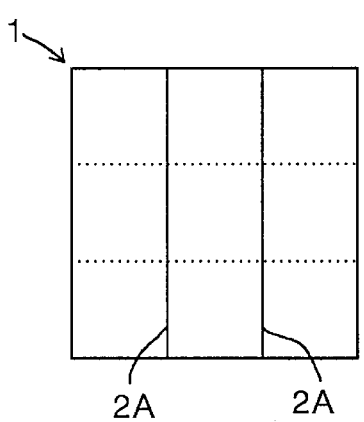
FIGS. 1A, 1B and 1C are a plan view, side view and front view, respectively, of a magnet block according to the invention showing a first set of slits in the upper surface and a second set of slits in the lower surface. The direction of magnetization is indicated by the bold arrow in FIG. 1C.

As is described above, the most characteristic feature of the inventive rare earth-based sintered permanent magnet block is that the magnet block having substantially parallel upper and lower surfaces is provided in each of the upper and lower surfaces with at least one or, preferably, a set of slits of a specified depth running in different directions making an angle of at least 10° within the plane of the surfaces. The incision depths of the slits should satisfy the requirement that the total of the largest incision depth of the slits in the upper surface and the largest incision depth of the slits in the lower surface is not smaller than but not larger than 5/3 times of the distance between the upper and lower surfaces. When this requirement is satisfied, the effective cross sectional area available for generation of eddy currents can be greatly decreased.

Eddy current is an electric current generated in a conductive body to flow in the direction to disturb changes in the magnetic flux therethrough. The mechanism in one aspect for the generation of an eddy current in motors is that the relative position of the rotor and stator or armature is varied by the rotation of the rotor to particularly increase changes of the magnetic flux in the slots. The mechanism therefor in another aspect is that the wave form of the rotating magnetic flux generated by the armature is not an ideally smooth sine curve. Further, the high-frequency carrier current passing the armature is responsible for a part of the eddy currents. Even though the portion where eddy currents are generated is not limited to the magnet, the influence of eddy currents is more serious in the magnets than in other parts of the motor because of the trouble of thermal demagnetization in the magnet due to the temperature elevation therein with the heat generated by the eddy currents.

Since an eddy current is generated in a portion under variation of the magnetic flux, the influence of eddy currents in the magnet is particularly serious on the surface of the magnet facing the armature.

The influence of the eddy current could be avoided if the effective resistance is increased in the vicinity of the region for passing of the eddy current. Although the most reliable and effective way therefor is that the magnet body is divided into segments by cutting over the whole surface in a plane parallel to the thickness of the magnet block and the segments are adhesively bonded together into an integral magnet block with intervention of an insulating adhesive layer between the segments, this method is practically disadvantageous as is mentioned before. An alternative way for decreasing the eddy current therefore is that the surface layer of the magnet block is provided with slits.

The most characteristic feature in the rare earth-based sintered permanent magnet of the invention, which has an upper surface and a lower surface substantially parallel each to the other, is that each of the upper and lower surfaces is provided with a set of slits running in a direction different from the running direction of the slits in the opposite surface making a substantial angle therebetween.

A description of the inventive magnet block with slits is given below by making reference to the accompanying drawing.

Figure 1B:
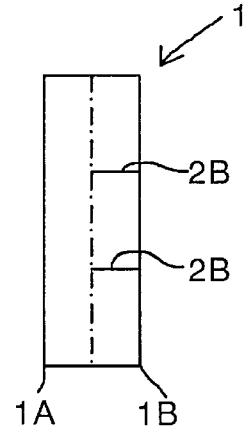
Figure 1C:
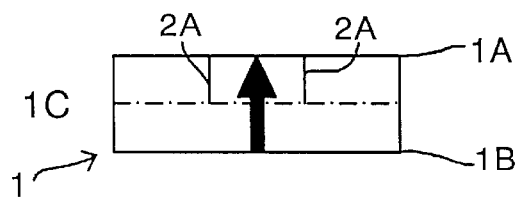

FIGS. 1A, 1B and 1C are each a plan view, side view and front view, respectively, of a typical example of the inventive slit magnet block 1, of which the upper surface 1A and lower surface 1B are substantially parallel each to the other. The upper surface 1A and lower surface 1B are provided each with a set of parallel-running two slits 2A and 2B, respectively, although the number of the slits in each of the upper and lower surfaces is selected depending on the desired degree of decreasing the eddy currents. For example, it is sometimes the case that a sufficient effect can be obtained by forming a single slit in each of the upper and lower surfaces.

As viewed in FIG. 1A, the running direction of the slits 2A in the upper surface 1A and-the running direction of the slits 2B in the lower surface 1B make an angle of 90° within the plane of the upper and lower surfaces although the angle can be as small as 10°.

FIGS. 1B and 1C indicate that the each of the slits 2A and 2B has a depth equal to a half of the thickness of the magnet block 1 so that the total of the depths of the slits 2A and 2B is approximately equal to the thickness of the magnet block 1, i.e. the distance between the upper and lower surfaces, although the total of the incision depths can be larger than but smaller than 5/3 times of the thickness of the magnet block 1. When the surface 1A or 1B is provided with a set of slits, this requirement is applied to the largest incision depth of the plurality of slits in one surface. When the total of the incision depths is too large, an undue decrease is caused in the bending strength of the magnet block 1 while, when the total is too small, the effect of decreasing the eddy currents is insufficient.

Figure 2:
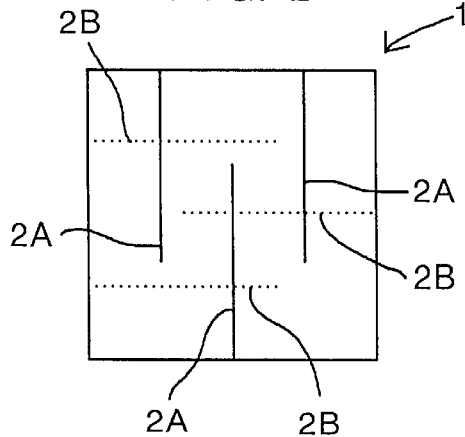
FIGS. 2 and 3 are each a plan view of the inventive permanent magnet block provided with sets of slits in the upper and lower surfaces.
Figure 3:
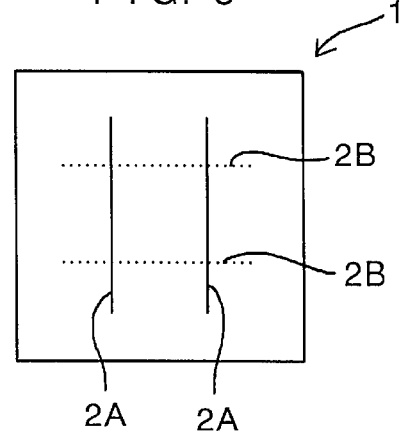

The length of each slit is not particularly limitative but preferably should be so long as to reach from one side to the opposite side of the magnet block as is illustrated in FIG. 1A in order to obtain a full effect of decreasing the eddy currents. It is of course possible that, as is illustrated in FIGS. 2 and 3, each of the slits 2A, 2B does not reach one of the sides of the magnet block at one end or does not reach both of the sides at both ends, respectively, provided that the length of the slit is two thirds or larger of the width between the opposite sides of the magnet block in consideration of the balance between the effect of decreasing the eddy currents and decrease in the bending strength of the magnet block.

Each of the slits preferably has a relatively small width not exceeding 1 mm in order not to disturb the distribution of the magnetic flux density and to have a decrease in the magnetic flux as small as possible. When the width of the slits is too large, the distribution of the magnetic flux density is greatly influenced by the magnet loss in the surface. More preferably, the width of the slits is 0.8 mm or smaller in consideration of the thickness of the cutting blade or diameter of the cutting wire in the slit-cutting machine such as internal-blade or external-blade cutting machines, wire saw machines and the like. Although the width of the slits has no particular lower limit, a width smaller than 0.05 mm is not practical in consideration of the limitation in the machine tools.

The slit-cutting machine used for the formation of the slits is not particularly limitative depending on the forms and dimensions of the magnet block. For example, a wire saw machine is advantageous because cutting of a plurality of slits can be performed at one time and the width of the slits can be decreased to be close to the wire diameter while disadvantageous in respect of the low velocity of slit cutting. On the other hand, cutter-blade machines are generally advantageous in respect of the slit-cutting velocity. External-blade cutter machines are also suitable for simultaneous cutting of a plurality of parallel slits. Cuttter-blade machines, however, are not suitable when cutting of slits having a small width is desired since the slit width is larger than that obtained with a wire saw machine. While it would be a possible idea that a magnet block having slits is prepared by compression-molding the magnet alloy powder into a powder compact for sintering by using a molding punch having a plurality of protrusions corresponding to the slits, this method has a difficulty in forming a slit having a width not exceeding 0.8 mm.

While the eddy current in the magnet block can be decreased by providing slits in the surface layers of the magnet block, it is unavoidable, as is mentioned before, that the bending strength of the magnet block is definitely decreased by forming the slits. In a rotor of the so-called surface magnet type, i.e. SPM type, the rotor is rotated at a high velocity so that a great centrifugal force acts on the magnet and the magnet is under a risk of breaking apart and being scattered off unless the magnet has a high mechanical strength. In a rotor of the internal magnet type, i.e. IPM type, on the other hand, the magnet is inserted into the cavity of the rotor and mechanically secured therein so that the problem relative to the decrease in the mechanical strengths of the magnet due to formation of the slits is less serious than in the SPM type rotors.

In order to solve or at least partly alleviate this problem of the decrease in the mechanical strengths of the magnet provided with slits, it is desirable that the void spaces of the slits are impregnated with an electrically insulating impregnant material such as an adhesive or resin as a reinforcement material so that the decrease in the mechanical strengths of the magnet body due to slits can be compensated for without affecting the effectiveness for decreasing the eddy currents. The advantage obtained with the inventive rare earth-based sintered permanent magnet is more remarkable in the IPM type rotors than in the SPM type rotors.

It is desirable that the above mentioned insulating adhesive or resin satisfies the requirement for the compatibility between the adhesive bonding strength and heat resistance. Examples of suitable adhesives in this regard include epoxy-based adhesives, acrylic adhesives and silicone-based adhesives. Several grades of commercial products of epoxy-based adhesives are available including that sold under the trade name of Scotchweld EW-2 (a product by Sumitomo 3M Co.) which can be used in both of the SPM type and IPM type rotors. Silicone resins can be used as the slit-impregnating resin if the rotor is of the IPM type because the adhesive bonding strength of silicone resins in general is not very high although silicone resins have excellent heat resistance and good elastic resilience.

The insulating impregnant material for filling the slit gaps can be a resin composition as a uniform blend of a resin and fine particles of a permanent magnet used for the preparation of a resin-bond magnet. Since such a resin-magnet powder composition acts as a magnetic material, the decrease in the magnetic properties of the magnet provided with slits can be compensated for to some extent by impregnating the slits with such a composition although the adhesive bonding strength obtained with such a resin composition cannot be high enough as compared with the adhesive bonding strength obtained with an adhesive resin per se: Accordingly, use of such a resin composition as an impregnant of the slits is not recommendable for SPM type rotors. The above mentioned fine particles of a permanent magnet can be prepared by pulverizing a quenched thin ribbon of a Nd/Fe/B-based permanent magnet alloy or a $Sm_2Co_{17}$-based magnet block.

The slit voids can be impregnated with the above mentioned insulating resinous material by filling the voids with the material in the flowable form followed by solidification or curing thereof.

The rare earth-based sintered permanent magnet body according to the invention is prepared by sintering a powder compact of a Nd/Fe/B-based or Sm/Co-based magnet alloy and has a general configuration of a rectangular or square board something like a flat tile. Resin-bond magnets are not within the scope of the present invention since a resin-bond magnet is usually free from the problem of eddy currents.

Despite the additional step of slit cutting necessary for the preparation of the inventive magnet block, the preparation process of the inventive magnet block is simple and efficient as compared with segment magnets prepared by adhesively bonding together a plurality of segment magnet pieces and still the eddy current-decreasing effect in the inventive magnet is about the same as in segment magnets.

Since the void space formed by slit cutting in the base magnet block is very small, the decrease in the magnetic flux thereby is negligibly small and little affects the electromagnetic torque of the motor. Accordingly, the permanent magnet built in the rotor of a permanent magnet synchronous motor is not required to have an excessively large coercive force which is indispensable when the permanent magnet is subject to temperature elevation as a consequence of the heat generated by the eddy currents. Thus, the cost reduction in the manufacture of permanent magnet synchronous motors would be very great because a permanent magnet having magnetic properties of a relatively low grade can be used in the motor. The problem of corrosion-resistance of the magnet is of no particular matter since the corrosion-resistant coating treatment can be performed without difficulties even when the magnet block is provided with slits.

EXAMPLE

Four sintered permanent magnet boards of 42 MGOe-grade Nd/Fe/B-based magnet (N42H, a product by Shin-Etsu Chemical Co.) each having 40 mm by 60 mm by 5 mm dimensions were prepared and subjected to electrolytic nickel plating. An IPM type rotor for a synchronous motor having a diameter of 70 mm and a height of 62 mm was prepared by inserting the permanent magnet boards into the respective cavities of a rotor base formed by laminating silicon steel sheets of 0.5 mm thickness. Each of the permanent magnet boards was provided with slits in the surface facing the armature of the motor and in the other surface opposite to the armature. Namely, the first surface was provided with three slits each having a length of 60 mm, width of 0.5 mm and depth of 2.5 mm running in parallel to the direction of the 60 mm-long side keeping a distance of 10 mm between adjacent slits while the second surface was provided with five slits each having a length of 40 mm, width of 0.5 mm and depth of 2.5 mm running in parallel to the direction of the 40 mm-long side keeping a distance of 10 mm between adjacent slits. The work of slit cutting was performed by using an external-blade cutter machine equipped with a multiblade unit of 0.4 mm blade thickness. The slits of the permanent magnet boards were impregnated with an epoxy-based room temperature-curable adhesive (Scotchweld EW-2, supra).

The thus prepared rotor was built in a stater having a 12-slot armature to construct a synchronous motor which was driven for 1 hour at 6000 rpm by supplying a three-phase AC power to the armature. The motor was disassembled immediately after 1 hour of running to find that the temperature of the permanent magnet boards was 90° C.

A comparative testing procedure was conducted in just the same manner as above except that the permanent magnet boards built in the rotor were not provided with slits to find that the temperature of the permanent magnet boards immediately after 1 hour of test running was 145° C. indicating that a substantial decrease could be obtained in the temperature elevation of the permanent magnets by forming slits in the permanent magnets according to the present invention.

What is claimed is:

1. A rare earth-based sintered permanent magnet block having an upper surface and a lower surface substantially parallel to each other, each surface being provided with at least one slit, of which the direction of the slit in the upper surface is substantially perpendicular to the direction of the slit in the lower surface and the total of the incision depth of the slit in the upper surface and the incision depth of the slit in the lower surface is not smaller than the distance between the upper and lower surfaces but not larger than ⅔ times the distance between the upper and lower surfaces.

2. The rare earth-based sintered permanent magnet block as claimed in claim 1 in which the slit has a width not exceeding 1 mm.

3. The rare earth-based sintered permanent magnet block as claimed in claim 1 in which the slit has a length of at least two thirds of the length to reach the opposite sides of the surface in which the slit is provided.

4. The rare earth-based sintered permanent magnet block as claimed in claim 1 in which the slit is impregnated with an insulating material.

5. The rare earth-based sintered permanent magnet block as claimed in claim 4 in which the insulating material impregnating the slit an adhesive resin.

6. The rare earth-based sintered permanent magnet block as claimed in claim 4 in which the insulating material impregnating the slit is a blend of an adhesive resin and particles of a permanent magnet.

* * * * *